UNITED STATES PATENT OFFICE.

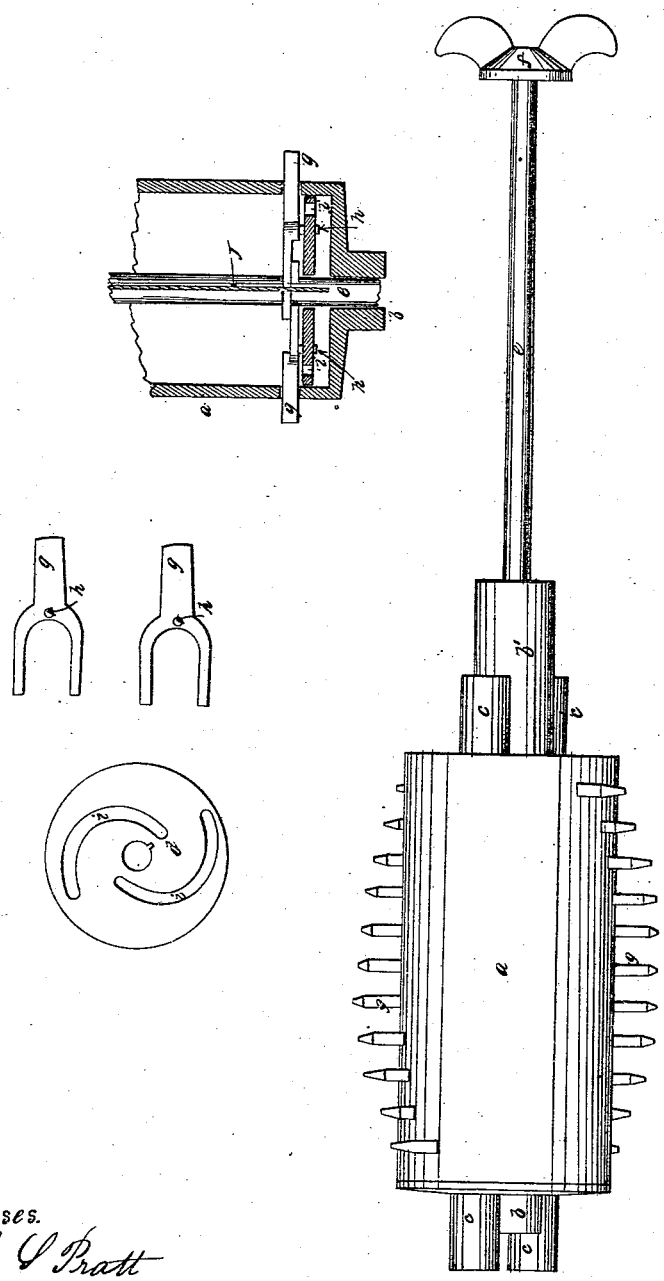

SALMON R. PLUMB, OF SOUTHINGTON, CONNECTICUT, ASSIGNOR TO PECK SMITH MANUFACTURING COMPANY, OF SAME PLACE.

IMPROVEMENT IN CASTING CYLINDERS FOR MEAT-CUTTERS.

Specification forming part of Letters Patent No. 29,440, dated July 31, 1860.

*To all whom it may concern:*

Be it known that I, S. R. PLUMB, of Southington, county of Hartford, and State of Connecticut, have invented certain new and useful Improvements in Patterns for Forming Protuberances or Projections on Cylindrical Surfaces for Meat-Cutters, &c.; and I do hereby declare that the same is described and represented in the following specification and drawings; and to enable others skilled in the art to make and use said improvement in patterns for the various purposes, I will proceed to describe its construction and operation, referring to the drawings, in which the same letters indicate like parts in each of the figures.

The nature of this improvement consists in making a pattern hollow, round, or of irregular sides or shape, and arranging therein proper mechanism for protruding outward such shaped protuberances or projections as may be desirable to form on the outside of such shaped cylindrical body, and hold them out while the molding process is being performed, and also to retract (or draw the protuberances or projections) them from the mold into the body of the cylinder, while the flask or mold is yet closed, so that the flask or mold may be opened or taken apart and the pattern drawn therefrom without breaking or separating the particles of which the mold is formed or into which the melted metal is poured, to produce the required shaped cylinder with its protuberances or projections for meat-cutters, and which it is proposed to use or apply to the making of cylinders having protuberances or projections for various other purposes.

The accompanying drawings show a delineated view of a pattern made to produce a cylinder having its projections for a meat-cutter, &c.

$a$ is a cylinder. $b$ are the bearings or journals on which it (the cylinder) revolves.

$c$ are core-prints for sustaining the core when placed after the pattern is removed and before the mold is closed for the purpose of forming the cylinder hollow, (it being the common or ordinary way of forming hollow cylinders.)

$d$ is a slitted flange-cam, made in the proper manner to suit the required result to be produced by their action.

$e$ is an actuating-rod extending through the journals $b$, cylinder $a$, and a sufficient distance from the ends of the journals $b'$ to reach just outside of the flask in which the cylinder $a$ is to be molded, and having a button or handle, $f$, by which to turn it (the actuating-rod $e$) when required. Said rod $e$ is provided with a spline, $j$, its whole length inside of the cylinder $a$, onto which the cams $d$ are fitted, and by which they are caused to turn with the rod $e$.

$g$ are patterns of the "protuberances or projections," the inner ends of which are forked so as to straddle the hub of the cam or shaft $d e$, thereby causing each of their movements in and out to be in a straight line from the center through the shell or body of the cylinder $a$, the outer or projecting portion of which is made the shape that the protuberances or projections are required to be upon the outside of the cylinder to be produced therefrom.

$h$ are pins secured or formed on the side of the patterns $g$, and are fitted to the slits or cams $i$, made in the flanges $d$.

The mode of molding this pattern is very much the same as that of molding other patterns, and when molded, and it is desired to remove the pattern from the mold, the workman is enabled, by means of turning the button or handle $f$, (outside of the flask,) to draw the projecting patterns $g$ into the body of the cylinder-pattern $a$. He then removes the cope of the flask and draws the whole pattern from the mold in the ordinary way, places the core therein, and closes the flask, when it will be in readiness to receive the melted iron or other metal. Thus it will be seen that the protuberances or projections may be formed in any desirable shape, and extend in any direction from the center of the cylinder through its shell without any difficulty in the molding and drawing of the same.

I believe I have clearly described the nature, construction, and operation of my improvement in patterns, and in doing so have shown the advantage to be derived therefrom.

What I claim, therefore, and desire to secure by Letters Patent, is—

1. Making a pattern having protuberances or projections extending to different points from the center, so as to withdraw the same from the mold, while the whole is closed in the flask by means of proper mechanism arranged within the pattern, substantially such as herein set forth and described.

2. An improved manufacture of meat-cutter cylinders, &c., produced by means substantially such as herein set forth and described.

In testimony whereof I have hereunto set my hand and affixed my seal this 5th day of April, 1860.

SALMON R. PLUMB. [L. S.]

In presence of—
H. S. PRATT,
JEREMY W. BLISS.